United States Patent [19]

Itoh et al.

[11] Patent Number: 4,678,827

[45] Date of Patent: Jul. 7, 1987

[54] FLAME-RETARDANT SILICONE RUBBER COMPOSITION

[75] Inventors: Kunio Itoh; Kiyoshi Imai; Takeo Yoshida; Motoo Fukushima, all of Annaka, Japan

[73] Assignee: Shin-Etsu Chemical Co., Ltd., Tokyo, Japan

[21] Appl. No.: 846,260

[22] Filed: Mar. 31, 1986

[30] Foreign Application Priority Data

Apr. 2, 1985 [JP] Japan ................................ 60-69549

[51] Int. Cl.$^4$ .............................................. C08K 5/54
[52] U.S. Cl. .................................... 524/188; 524/401; 524/440; 524/588; 524/860; 524/862
[58] Field of Search ............... 524/401, 440, 188, 588, 524/860, 862

[56] References Cited

U.S. PATENT DOCUMENTS 2,891,033  6/1959  Savage ................................. 524/440
4,100,075  7/1978  Ashman et al. ...................... 524/188

Primary Examiner—Melvyn I. Marquis
Attorney, Agent, or Firm—Hopgood, Calimafde, Kalil, Blaustein & Judlowe

[57] ABSTRACT

A flame-retardant silicone rubber composition is prepared by admixing a base compound of a dimethylpolysiloxane gum and a siliceous filler with a combination of a platinum compound and an organosilicon compound having at least one nitrogen-containing organic group and at least one aliphatically unsaturated group in a molecule in such a proportion that the molar ratio of nitrogen to platinum is within a specified range. The effect of flame retardancy exhibited by the composition is so reliable and constant that the effect can be obtained regardless of the type of the peroxide curing agent and the curing behavior of the composition is never affected by the formulation of the flame retardant agent.

3 Claims, No Drawings

FLAME-RETARDANT SILICONE RUBBER COMPOSITION

BACKGROUND OF THE INVENTION

The present invention relates to a flame-retardant silicone rubber composition or, more particularly, to a flame-retardant silicone rubber composition capable of exhibiting constant flame retardancy by the admixture of a specific flame retardant agent which is free from the problems of toxicity and adverse influences on the curing behavior of the composition as well as the mechanical properties of the cured silicone rubber thereof which is useful as an insulating material in various electric and electronic parts.

Various proposals and attempts have been made hitherto with an object to impart flame retardancy to silicone rubbers including the methods of admixture of a silicone rubber composition with a platinum compound (see, for example, Japanese Patent Publication No. 44-2591), combination of a platinum material and carbon black (see, for example, Japanese Patent Publication 47-16546) and combination of a platinum material and a fumed titanium dioxide filler (see, for example, Japanese Patent Publication 47-21826) although no satisfactory flame retardancy has yet been obtained in each of these prior art methods.

A problem accompanying the formulation of a platinum compound as a flame retardant agent is that, when the curing catalyst formulated in the silicone rubber composition is an alkyl peroxide, the flame retardancy of the silicone rubber is improved to a less extent than in the formulation with an acyl peroxide as the curing catalyst. In this regard, a proposal is made in Japanese Patent Publication 51-234302 to add a platinum compound as combined with an azo compound. This method, however, involves disadvantages that the decomposition products of the azo compound in the vulcanization may sometimes cause blistering of the cured rubber, in particular, when vulcanization is performed by the so-called hot-air vulcanization under normal pressure and that the decomposition products are toxic to cause a serious safety problem. Therefore, it is eagerly desired to develop a novel flame-retardant silicone rubber composition which is free from the above described problems and disadvantages in the silicone rubber compositions formulated with a conventional flame retardant agent of the prior art.

SUMMARY OF THE INVENTION

The flame-retardant and self-extinguishable silicone rubber composition of the invention, which can overcome the above described problems and disadvantages in the prior art, comprises:

(a) 100 parts by weight of an organopolysiloxane represented by the average unit formula $R_aSiO_{(4-a)/2}$, in which R is a monovalent hydrocarbon group and the subscript a is a positive number in the range from 1.90 to 2.05;

(b) from 20 to 200 parts by weight of a finely divided silica filler;

(c) from 1 to 200 ppm by weight of platinum or a platinum compound as platinum based on the component (a); and (d) an organosilicon compound having at least one nitrogencontaining organic group and at least one aliphatically unsaturated group in a molecule in such an amount that 1 to 500 moles of nitrogen atoms are provided per mole of the platinum in the component (c).

DETAILED DESCRIPTION OF THE PREFERRED EMBODIMENTS

As is understood from the above given summarizing description, the most characteristic feature of the inventive silicone rubber composition is in the formulation of a specific organosilicon compound having a nitrogen-containing organic group and an aliphatically unsaturated group in a molecule as the component (d). This unique formulation has been established as a result of the extensive investigations undertaken by the inventors with an object to develop a novel flame-retardant silicone rubber composition of which the cured rubber can exhibit constant flame retardancy leading to a discovery that a silicone rubber composition formulated by the combined admixture of a platinum compound and the above described specific organosilicon compound can exhibit satisfactory curing behavior and the cured silicone rubber thereof has excellent mechanical properties along with constant flame retardancy which is unaffected by the conditions of vulcanization and by the type of the organic peroxide as the curing catalyst even when it is an alkyl peroxide to give a possibility of free selection of the curing catalyst. The flame retardancy obtained by the above described formulation of the composition is so excellent that no other auxiliary flame retardant agent need be added in combination leading to an advantage that the possible decrease in the heat resistance and mechanical properties of the cured rubber, which is otherwise unavoidable due to the admixture of a large amount of the flame retardant agents, can be avoided.

The component (a) comprised in the inventive composition is an organopolysiloxane, which may be any one of those organopolysiloxanes known in the art as the principal ingredient of silicone rubber compositions and is represented by the above given average unit formula. The group denoted by the symbol R in the formula is a monovalent hydrocarbon group exemplified by alkyl groups, e.g. methyl, ethyl, propyl and butyl groups, alkenyl groups, e.g. vinyl and allyl groups, aryl groups, e.g. phenyl and tolyl groups, and cycloalkyl groups, e.g. cyclohexyl group, as well as those substituted groups, e.g. chloromethyl, 3,3,3-trifluoropropyl, cyanomethyl and mercaptomethyl groups, obtained by replacing a part or all of the hydrogen atoms in the above named hydrocarbon groups with substituent atoms or groups such as halogen atoms, cyano groups, mercapto groups and the like. The groups denoted by R in a molecule may be of the same kind or may be different from each other. The subscript a is a positive number in the range from 1.90 to 2.05. This limitation of the subscript means that the organopolysiloxane has a substantially linear molecular structure as in diorganopolysiloxanes mainly composed of diorganosiloxane units.

The organopolysiloxane should have a viscosity of at least 1000 centistokes or, preferably, at least 100,000 centistokes or, more preferably, at least 1,000,000 centistokes at 25° C. The molecular chain ends of the organopolysiloxane should be blocked each with a hydroxy group or a trialkylsilyl, e.g. dimethylvinylsilyl or trimethylsilyl, group. It is also preferable that from 0.1 to 0.5% by moles of the diorganosiloxane units forming the molecular chain of the organopolysiloxane are the units represented by the unit formula R¹(CH₂=CH—)SiO, in which R¹ is a monovalent hydrocarbon group free from aliphatic unsaturation.

In a preferred embodiment of the invention the organopolysiloxane as the component (a) is a vinyl-containing dimethylpolysiloxane formed of from 99.5 to 99.9% by moles of dimethyl siloxane units of the formula (CH₃)₂SiO and from 0.1 to 0.5% by moles of vinyl methyl siloxane units of the formula (CH₃)(CH₂=CH)SiO and having a viscosity of at least 1000 centistokes at 25° C.

The component (b) comprised in the inventive composition is a finely divided silica filler which may be any of those well known in the art of silicone rubbers including fumed silica fillers, precipitated silica fillers, fine powder of quartz and diatomaceous earth, preferably, having a particle diameter of 50 μm or smaller. The amount of the silica filler as the component (b) in the inventive composition should be in the range from 20 to 200 parts by weight per 100 parts by weight of the organopolysiloxane as the component (a).

The component (c) comprised in the inventive silicone rubber composition is platinum or a platinum compound which may be in any of the forms conventionally used as a flame retardant agent in silicone rubbers. The platinum compound suitable for use is exemplified by chloroplatinic acid and complexes thereof with an alcohol, ether, aldehyde, vinylsiloxane and the like. The amount of this component (c) in the inventive composition should be sufficient to impart the composition with self-extinguishability. The amount is usually in the range from 1 to 200 ppm by weight as platinum based on the organopolysiloxane as the component (a).

The component (d) is the most characteristic ingredient in the inventive silicone rubber composition and is an organosilicon compound having, in a molecule, at least one nitrogen-containing organic group and at least one aliphatically unsaturated group. The nitrogen atom in the above mentioned nitrogen-containing organic group should preferably be in the form of an amino group —NH₂ or imino group —NH— bonded to a carbon atom or carbon atoms. Particular examples of the organosilicon compound include the organosilane compounds expressed by the following structural formulas, in which the symbols Me, Et, Vi and Pn each denote a methyl, ethyl, vinyl and 1,4-phenylene group, respectively:

(EtO)₃Si—(CH₂)₃NH—(CH₂)₂—NH—CH₂—Pn—Vi;
(EtO)₂(Me)Si—(CH₂)₃NH—(CH₂)₂NH—CH₂—Pn—Vi;
(MeO)₃Si—(CH₂)₃NH—(CH₂)₂NH—CH₂—Pn—Vi;
(MeO)₂(Me)Si—(CH₂)₃NH—(CH₂)₂NH—CH₂—Pn—Vi;
Vi—Pn—CH₂—NH—(CH₂)₃Si(OEt)₃;
Vi—Pn—CH₂—NH—CH₂—Si(Vi)(OMe)₂; and
NH₂—CH₂—CH₂—NH—CH₂—Si(Vi)(OMe)₂.

Instead of the above given organosilane compounds per se, it is optional to use an organopolysiloxane obtained by the hydrolysis and silanol condensation reaction thereof or the cohydrolysis and cocondensation reaction thereof with other hydrolyzable organosilane compounds so that the organopolysiloxane may contain the siloxane units, for example, of the formula (Me₂SiO) or (MeViSiO). Particular examples of such organopolysiloxanes include those expressed by the following structural formulas, in which the symbols Me, Et, Vi and Pn each have the same meaning as defined above and the subscripts m, n and p are each a positive integer:

[—Si(Me)(—CH₂CH₂CH₂—NH₂)—O—]ₘ.[—Si(Me)(Vi)—O—]ₙ;
[—Si(Me)(—CH₂CH₂CH₂—NH—CH₂CH₂—NH₂)—O—]ₘ.[—Si(Me)(Vi)—O—]ₙ;
Me₃Si—O—[—Si(Me)(—CH₂CH₂CH₂—NH₂)—O]ₘ—[SiMe₂—O]ₙ—Si(Me)(Vi)—O]ₚSiMe₃;
Me₃Si—O—Si(Me)(—CH₂CH₂CH₂—NH—CH₂CH₂—NH₂)]ₘ—[Si(Me)(Vi)—O]ₙSiMe₃[O—2]ₚMe;
[—Si(Me)(—CH₂CH₂CH₂—NH₂)—O—]ₘ.[Si(Me)(—CH₂CH₂CH₂—O—CO—CMe=CH₂)—O—]ₙ;
[—Si(Me)(—CH₂CH₂CH₂—NH—Pn—Vi)—O—]ₙ; and
HO—[—Si(Me)(—CH₂CH₂CH₂—NH—CH₂CH₂—NH—Pn—Vi)—O]ₘH.

The amount of these organosilicon compounds in the inventive silicone rubber composition should be sufficient to give from 1 to 500 moles or, preferably, from 2 to 300 moles of the nitrogen atoms therein per mole of the platinum in the component (c). An amount thereof smaller or larger than the above mentioned lower or upper limit, respectively, is detrimental to the object of the invention to impart the silicone rubber with self-extinguishability.

The silicone rubber composition of the invention can be prepared by uniformly blending the above described components (a) to (d) and the composition can be fabricated and cured by heating under pressure into various kinds of cured silicone rubber articles. In addition to the above described components (a) to (d), it is essential in order to obtain full curability of the composition that the composition contains (e) a crosslinking agent or curing agent which may be an organic peroxide or an organohydrogenpolysiloxane, the latter being effective in the case where the component (a) has at least two vinyl groups bonded to the silicon atoms in a molecule. The component (c) serves also as a catalyst to promote the addition reaction between the silicon-bonded vinyl groups and silicon-bonded hydrogen atoms. The organic peroxide suitable in this case is exemplified by benzoyl peroxide, 2,4-dichlorobenzoyl peroxide, di-tert-butyl peroxide, dicumyl peroxide, 2,5-bis(tert-butyl peroxy)-2,5-dimethyl hexane and the like. The amount of the organic peroxide should usually be in the range from 0.1 to 5 parts by weight per 100 parts by weight of the component (a). Preferable organohydrogenpolysiloxane is a methyl hydrogen polysiloxane having at least two hydrogen atoms directly bonded to the silicon atoms in a molecule. The amount thereof should be sufficient to provide from 0.8 to 2.0 moles of the silicon-bonded hydrogen atoms per mole of the silicon-bonded vinyl groups in the component (a).

The inventive silicone rubber composition may optionally be admixed with various kinds of other additives known in the art of silicone rubbers according to need including low-molecular organosilicon compounds such as diphenylsilane diol, diphenyl methyl silanol, low-molecular dimethylpolysiloxanes end-blocked with silanolic hydroxy groups, alkoxysilanes and the like, pigments and others as well as carbon black and fumed titanium dioxide effective to impart self-extinguishability to the composition.

Silicone rubber articles prepared by curing the above described flame-retardant silicone rubber composition of the invention can exhibit excellent self-extinguishability in comparison with conventional silicone rubbers and the selfextinguishability is not affected even when the composition contains a dialkyl peroxide, e.g. di-tert-butyl peroxide and 2,5-bis(tert-butyl peroxy)-2,5- dimethyl hexane, as the curing agent. Moreover, the silicone rubber composition is free from the drawbacks in curing such as blistering due to the decomposition products of the curing agent and inhibition or retardation of the curing reaction to cause poor elasticity of the cured rubber product. Accordingly, the silicone rubber composition of the invention is particularly useful for shaping, for example, anode caps of cathode ray tubes, insulating rubber packings, e.g. deflecting yoke wedge, insulating coverings of electric wires, e.g. high-voltage wires and heater wires, flame-retardant tubes and sleeves and the like.

In the following, the flame retardant silicone rubber composition of the invention is described in more detail by way of examples and comparative examples, in which the expression of "parts" always refers to "parts by weight" and the symbols Me, Et, Vi and Pn denote methyl, ethyl, vinyl and 1,4-phenylene groups, respectively. Examples 1 to 4 and Comparative Example 1.

A base blend was prepared by milling, in a two-roll mill, a mixture composed of 100 parts of a vinyl-containing dimethylpolysiloxane gum having a degree of polymerization of about 8000 and formed of 99.8% by moles of dimethyl siloxane units $Me_2SiO$ and 0.2% by moles of methyl vinyl siloxane units MeViSiO, 30 parts of a fumed silica filler having a specific surface area of 200 $m^2/g$ (Aerosil 200, a product by Nippon Aerosil Co.) and 3 parts of diphenylsilane diol as a dispersing aid of the silica filler followed by a heat treatment at 180° C. for 2 hours. A master compound, referred to as Compound A hereinbelow, was prepared by admixing 130 parts of the thus prepared base blend with 40 parts of a fine powder of quartz having an average particle diameter of about 5 μm and 0.1 part of an isopropyl alcohol solution of chloroplatinic acid containing 2% by weight of platinum.

Each 100 parts portion of the Compound A was admixed and uniformly blended in Example 1 to 4 with 0.6 part of dicumyl peroxide and one of the organosilicon compounds containing nitrogen atoms and vinyl groups as shown below, referred to as the component (d), in an amount indicated in Table 1 to give the molar ratio of nitrogen to platinum (N/Pt) as indicated.

lowed by postcure at 200° C. for 4 hours. The cured silicone rubber sheets were subjected to the test of flame retardancy according to the procedure of the UL-94 standard to give the results shown in Table 1 which also shows the result obtained with a comparative composition prepared with the same formulation as above excepting the omission of the nitrogen- and vinyl-containing organosilicon compound as the component (d) (Comparative Example 1).

TABLE 1

|  | Example | | | | Comparative |
|---|---|---|---|---|---|
|  | 1 | 2 | 3 | 4 | Example 1 |
| Component (d), parts | 0.30 | 0.046 | 0.40 | 0.045 | — |
| Molar ratio of N/Pt | 14 | 68 | 260 | 48 | — |
| Flame retardancy, seconds | 9 | 7 | 6 | 5 | 50 |

EXAMPLE 5

Silicone rubber compositions were prepared with the same formulation as in Example 2 described above with varied amounts of the Organosilane I as the component (d) and cured into rubber sheets in the same manner. Table 2 below shows the amount of the component (d) together with the molar ratio of N/Pt and the result of the flame retardancy test for each of the compositions.

TABLE 2

| Component (d), parts | 0.003 | 0.006 | 0.012 | 0.046 | 0.069 | 0.138 | 0.276 |
|---|---|---|---|---|---|---|---|
| Molar ratio of N/Pt | 4 | 8 | 17 | 68 | 102 | 204 | 408 |
| Flame retardancy, seconds | 15 | 9 | 7 | 7 | 9 | 12 | 25 |

EXAMPLE 6

Silicone rubber compositions were prepared with the same formulation as in Example 3 described above with varied amounts of the Organosilane II as the component (d) and by replacing 0.6 part of the dicumyl peroxide with 0.4 part of 2,5-bis(tert-butyl peroxy)-2,5-dimethyl hexane and cured into rubber sheets in the same manner. Table 3 below shows the amount of the component (d) together with the molar ratio of N/Pt and the result of the flame retardancy test for each of the compositions. As is clear from these results, the flame retardancy of the cured rubber sheets was unsatisfactory when the molar ratio of N/Pt was smaller than 1 or larger than 500.

TABLE 3

| Component (d), parts | 0.0005 | 0.005 | 0.05 | 0.20 | 0.30 | 0.50 | 0.70 | 1.0 |
|---|---|---|---|---|---|---|---|---|
| Molar ratio of N/Pt | 0.3 | 3.3 | 33 | 132 | 198 | 330 | 462 | 660 |
| Flame retardancy, seconds | 50 | 23 | 9 | 6 | 6 | 6 | 7 | 30 |

(1) Organopolysiloxane I (Example 1)

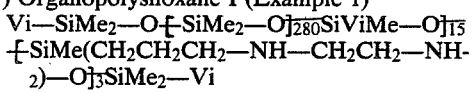
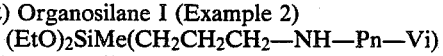

(2) Organosilane I (Example 2)
  $(EtO)_2SiMe(CH_2CH_2CH_2—NH—Pn—Vi)$ (3) Organosilane II (Example 3)
  $(MeO)_3Si(CH_2CH_2CH_2—NH—Pn—Vi)$ (4) Organosilane III (Example 4)
  $(MeO)_3Si(CH_2CH_2CH_2—NH—CH_2CH_2—NH—Pn—Vi)$ The thus obtained silicone rubber compositions were each shaped into a sheet having a thickness of 1 mm which was press-cured at 170° C. for 10 minutes fol-

EXAMPLE 7.

A silicone rubber composition was prepared with the same formulation as in Example 1 described above except that 0.6 part of the dicumyl peroxide was replaced with 1.5 parts of a methyl hydrogen polysiloxane (KF-99, a product by Shin-Etsu Chemical Co.) so that the curing reaction could proceed by the addition reaction between the silicon-bonded vinyl groups and the silicon-bonded hydrogen atoms. A sheet of the composition having a thickness of 1 mm was cured by heating at 170° C. for 10 minutes and subjected to the test of flame retardancy to give a result of 8 seconds. Examples 8 to 10 and Comparative Examples 2 and 3.

A base blend of silicone rubber was prepared by uniformly blending, in a kneader, 100 parts of a vinyl-containing dimethylpolysiloxane having an average degree of polymerization of about 7000 formed of 99.85% by moles of dimethyl siloxane units Me$_2$SiO and 0.15% by moles of vinyl methyl siloxane units ViMeSiO and terminated at both molecular chain ends each with a vinyl dimethyl siloxy group Me$_2$ViSiO, 57 parts of a fumed silica filler having a specific surface area of 110 m$^2$/g and surface-blocked with dimethyl siloxane groups Me$_2$SiO (R-972, a product by DEGUSSA Co.), 3 parts of diphenylsilane diol as a dispersing aid of the silica filler and 5 parts of a dimethylpolysiloxane having an average degree of polymerization of 20 and terminated at both molecular chain ends each with a silanolic hydroxy group followed by heating at 170° C. for 3 hours in the kneader. After cooling, 165 parts of the thus prepared base blend were admixed and uniformly blended with 5 parts of a fumed titanium dioxide powder (P-25, a product by DEGUSSA Co.) and 0.1 part of a 2-ethylhexanol solution of chloroplatinic acid containing 2% by weight of platinum to give a master compound, which is referred to as the Compound B hereinbelow.

In Examples 8 to 10, each 100 parts portion of the Compound B was admixed with the Organosilane III used in Example 4 as the component (d) in an amount indicated in Table 4 below and 0.8 part of 2,4-dichlorobenzoyl peroxide to give silicone rubber compositions which were each shaped into sheets of 1 mm and 6 mm thickness. The sheets were subjected to hot-air vulcanization by heating in an oven at 300° C. for 30 seconds under normal pressure. No blistering was found on each of the sheets of 6 mm thickness. The sheets of 1 mm thickness were subjected to the test of flame retardancy to give the results shown in Table 4.

For comparison, silicone rubber compositions were prepared with the same formulation as above excepting the omission of the Organosilane III in Comparative Example 2 or replacement of the Organosilane III with 0.25 part of azobisisobutyronitrile in Comparative Example 3 and the cured sheets thereof were subjected to the test of flame retardancy to give the results shown in Table 4. No blistering was found on the cured sheet of 6 mm thickness in Comparative Example 2 but remarkable blistering was noted on the cured sheet in Comparative Example 3.

TABLE 4

|  | Example | | | Comparative Example | |
|---|---|---|---|---|---|
|  | 8 | 9 | 10 | 2 | 3 |
| Component (d), parts | 0.015 | 0.045 | 0.12 | — | — |
| Molar ratio of N/Pt | 16 | 48 | 128 | — | — |
| Flame retardancy, seconds | 4.2 | 3.5 | 5.7 | 12.5 | 4.0 |

What is claimed is:
1. A flame-retardant silicone rubber composition which comprises:
 (a) 100 parts by weight of an organopolysiloxane represented by the average unit formula R$_a$SiO$_{(4-a)/2}$, in which R is a monovalent hydrocarbon group and the subscript a is a positive number in the range from 1.90 to 2.05;
 (b) from 20 to 200 parts by weight of a finely divided silica filler;
 (c) platinum or a platinum compound in an amount from 1 to 200 ppm by weight as platinum based on the amount of the component (a);
 (d) an organosilicon compound having at least one nitrogen-containing organic group and at least one aliphatically unsaturated group in a molecule in such an amount that 1 to 500 moles of nitrogen atoms are provided per mole of the platinum in the component (c); and
 (e) an organic peroxide or an organohydrogenpolysiloxane curing agent.
2. The flame-retardant silicone rubber composition as claimed in claim 1 wherein the organopolysiloxane as the component (a) is a vinyl-containing dimethylpolysiloxane formed of from 99.5 to 99.9% by moles of dimethyl siloxane units of the formula (CH$_3$)$_2$SiO and from 0.1 to 0.5% by moles of vinyl methyl siloxane units of the formula (CH$_3$)(CH$_2$=CH)SiO and having a viscosity of at least 1000 centistokes at 25° C.
3. The flame-retardant silicone rubber composition as claimed in claim 1 wherein the nitrogen atom in the nitrogen-containing organic group is in the form of an amino group or an imino group bonded to a carbon atom or carbon atoms.

* * * * *